(12) United States Patent
Ratschunas

(10) Patent No.: US 6,958,692 B1
(45) Date of Patent: Oct. 25, 2005

(54) PERSONAL ORGANIZER EQUIPMENT

(75) Inventor: Kalevi Ratschunas, Espoo (FI)

(73) Assignee: Nokia Corporation, Espoo (FI)

( * ) Notice: Subject to any disclaimer, the term of this patent is extended or adjusted under 35 U.S.C. 154(b) by 406 days.

(21) Appl. No.: 10/030,669

(22) PCT Filed: Jul. 13, 2000

(86) PCT No.: PCT/IB00/01027

§ 371 (c)(1),
(2), (4) Date: Apr. 4, 2002

(87) PCT Pub. No.: WO01/04577

PCT Pub. Date: Jan. 18, 2001

(30) Foreign Application Priority Data

Jul. 13, 1999 (GB) .................................... 9916408

(51) Int. Cl.[7] .............................................. G08B 1/08
(52) U.S. Cl. ...................... 340/539.13; 340/539.17; 340/539.21; 340/995.18; 368/14; 368/28; 455/456.1; 455/457; 342/357.17
(58) Field of Search ...................... 340/539.13, 539.17, 340/539.21, 995.18; 368/14, 28, 244; 455/456.1, 455/457; 342/357.17

(56) References Cited

U.S. PATENT DOCUMENTS

| 5,307,400 A | * | 4/1994 | Sawyer et al. ........... 455/456.1 |
| 5,375,018 A | * | 12/1994 | Klausner et al. ............. 368/47 |
| 5,525,958 A | * | 6/1996 | Negishi et al. .......... 340/309.7 |
| 5,528,248 A | * | 6/1996 | Steiner et al. ......... 342/357.06 |
| 5,790,074 A | | 8/1998 | Rangedahl et al. ......... 342/357 |
| 5,790,974 A | * | 8/1998 | Tognazzini ............... 455/456.5 |
| 5,938,721 A | | 8/1999 | Dussell et al. .............. 701/211 |
| 2002/0067308 A1 | * | 6/2002 | Robertson .............. 342/357.17 |

* cited by examiner

*Primary Examiner*—Tai T. Nguyen
(74) *Attorney, Agent, or Firm*—Cohen, Pontani, Lieberman & Pavane

(57) ABSTRACT

Location-dependant personal organizer apparatus for operation with a memory for storing a plurality of appointment entries, each appointment entry including data specifying a time and a place; the personal organizer comprising: a locating unit capable of determining the location of the personal organizer; a clock capable of determining the present time; an alerting unit for generating an alert to a user; and an alert processor coupled to the memory, the locating unit, the clock and the alerting unit and capable of actuating the alerting unit at a period before the stored time for an appointment entry that is dependant on the stored place for that appointment entry and the determined location of the personal organizer.

46 Claims, 1 Drawing Sheet

PERSONAL ORGANIZER EQUIPMENT

PRIORITY CLAIM

This is a national stage of PCT application No. PCT/IB00/01027, filed on Jul. 13, 2000. Priority is claimed on that application, and on patent application No. 9916408.9 filed in Great Britain on Jul. 13, 1999.

FIELD OF THE INVENTION

This invention relates to personal organiser equipment, and especially location-dependant personal organiser equipment.

BACKGROUND OF THE INVENTION

It is becoming increasingly popular to use electronic personal organiser equipment for managing appointments. In addition to dedicated personal organisers, which are usually in a palmtop format, personal organisation functions have been provided in mobile phones, wristwatches and software for personal computers. Personal organisers usually include a diary/calendar whereby a user may enter the time and date of an appointment together with details of the appointment such as its location and purpose. Many personal organisers are able to remind a user at the time of an appointment, or at a set time beforehand. The reminder could take the form of an audible alarm or another alerting format such as flashing of an indicator light or vibration.

It can be difficult for a user to obtain appropriate reminders from such a conventional diary/calendar because the time at which a reminder should ideally be given is dependant on the amount of time the user needs to reach the appointment. One approach is for the organiser to remind a user of an appointment at the very time of the appointment. However, if the user is not already at the location of the appointment when the reminder is issued then the reminder is likely to have come too late to allow the user to reach the appointment on time; alternatively, if the user has already got to the appointment by the time the reminder issues then his appointment may be unwantedly interrupted by the reminder. Another approach is to have the personal organiser equipment generate a reminder a set time in advance of the appointment. However, this requires the user to configure the equipment to generate such reminders, and since they are issued at a fixed timer before the appointment the advance reminder-s are unlikely to be at an appropriate time to cause the user to travel efficiently to his appointment. In addition, the effectiveness of the personal organiser, and its popularity with a user, is diminished by it issuing inappropriate alerts.

Separately from personal organiser technology, apparatus exists for determining a user's location. Systems for determining location include satellite location systems such as GPS (global positioning system) and cellular radio location systems, for example making use of measurement of timing differences between nearby basestations. In the GPS system a receiver determines its location by means of signals received from earth-orbiting satellites. It is also possible for a mobile station in a cellular telephone network or the like to determine its location (or for the network to determine its location) by timing delays of signals to or from respective base-stations or by other means.

SUMMARY OF THE INVENTION

According to the present invention there is provided location-dependant personal organiser apparatus for operation with a memory for storing a plurality of appointment entries, each appointment entry including data specifying a time and a place; the personal organiser comprising: a locating unit capable of determining the location of the personal organiser; a clock capable of determining the present time; an alerting unit for generating an alert to a user; and an alert processor coupled to the memory, the locating unit, the clock and the alerting unit and capable of actuating the alerting unit at a period before the stored time for an appointment entry that is dependent on the stored place for that appointment entry and the determined location of the personal organiser.

The personal organiser itself preferably comprises the memory and/or the locating unit and/or the clock and/or the alert processor. The alert processor may comprise one or more integrated circuits. The alert processor may comprise a processing unit that is capable of cellular telephony processing.

The locating unit is suitably capable of periodically (and most preferably regularly) determining the location of the personal organiser and making that available to the alert processor. The alert processor or other processing means of the organiser may suitably be capable of initiating determination by the locating unit of the location of the personal organiser.

The memory is suitably capable of storing information defining the location of the place specified for the appointment entry. The memory is suitably capable of storing information defining journey speed or speeds for use by the alert processor. The alert processor is suitably capable of estimating the journey time needed to travel from the location of the personal organiser to the location of the place of the appointment entry and actuating the alerting unit at a period before the stored time for an appointment entry that is dependant on that journey time. The alert processor is capable of actuating the alerting unit when it determines that the present time is at or is after the time determined by subtracting the estimated journey time from the stored time of the appointment entry. The alert processor is capable of actuating the alerting unit when it determines that the present time is at or is after the time determined by subtracting the estimated journey time and an additional time period from the stored time of the appointment entry.

The locating unit is capable of determining the location of the personal organiser by means of a cellular telephone network and/or satellite signals (e.g. from the Global Positioning System) and/or by other means (such as receiving radio signals from local beacons or by integration from gyroscopic movement sensors).

The personal organiser is preferably capable of acting as a cellular telephone for making and/or receiving telephone calls and/or other cellular telephone functions.

The alert may be an audible alert, provided for example by a buzzer or speaker, a vibrational alert, provided for example by a vibration unit, or another form of alert (e.g. a visible flashing signal). The alert could take the form of an audible or non-audible alarm, for example a beep, tone or tune, flashing of an indicator light, displaying of a message or vibration. The alert could be provided by means of a message sent from a telecommunications network, for example a text message such as a short message service (SMS) message.

Instead of being located at the user's personal organiser equipment, some or all of the memory could be located elsewhere, for example on the network side of a telecommunications system. The division of memory sites could be chosen to optimise communication between the network and the terminal. The memory could be a central memory serving the personal organisers of several people. Thus the memory could store a plurality of appointment entries for the plurality of users. The memory could be located on the network side of a telecommunications system, for example a cellular and/or radio telephone system. The network may be provided with means for permitting each of the users to access his entries in the memory and/or to inhibit his access to other users' entries. A user may access the entries by an internet protocol such as hypertext transfer protocol (HTTP).

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The present invention will now be described by way of example, with reference to the accompanying drawings, in which.

DETAILED DESCRIPTION OF THE PRESENTLY PREFERRED EMBODIMENTS

Figure 1:
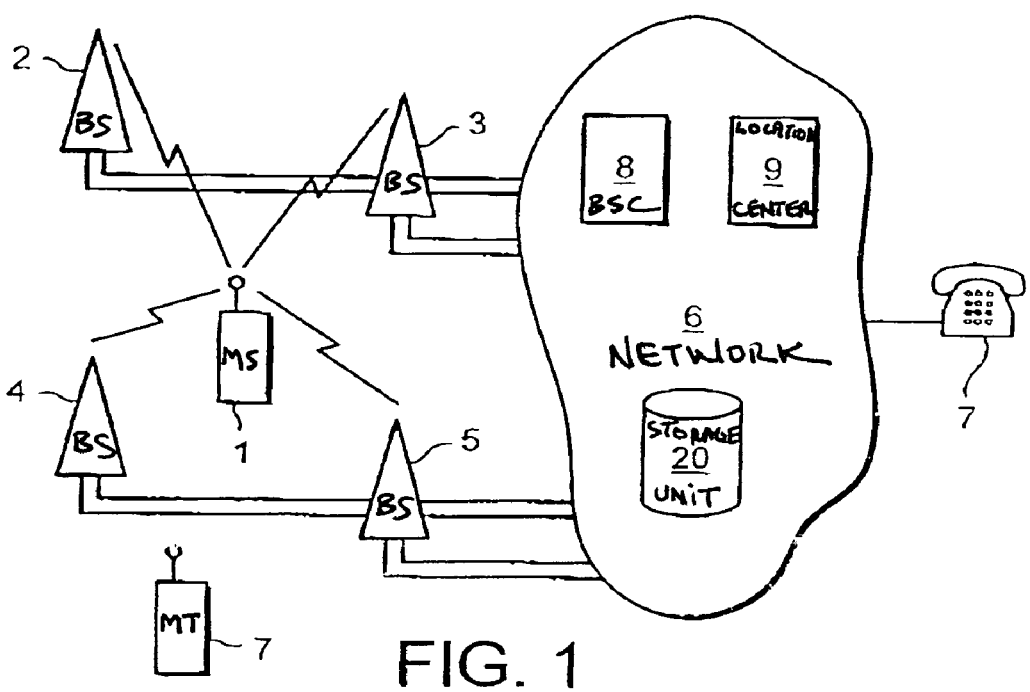
FIG. 1 is a schematic drawing of part of a cellular telephone system.

FIG. 1 shows a cellular telephone system in which a mobile phone 1 can communicate by radio with basestations 2–5 and from there via a communications network 6 with users of other terminals 7.

In many cellular telephone systems the basestations transmit periodic signals under the control of a unit functioning as a base station controller (BSC) 8. The network can be provided with a locating unit or location centre 9. If there is a need to determine the mobile phone's location the locating unit can transmit a signal via one of the base stations 2–5 to cause the mobile phone to measure the timing differences in the periodic signals it can receive from nearby basestations. The mobile station transmits the measured timing differences to the locating unit 9. The locating unit 9 is aware of the locations of the basestations and can therefore triangulate the mobile phone's position by means of the timing differences. The calculated position can be transmitted back the mobile phone 1. The precision given by the locating procedure depends on a number of factors, including the number of basestations that the mobile phone can receive. However, an precision of within a few tens of meters is generally feasible.

Figure 2:
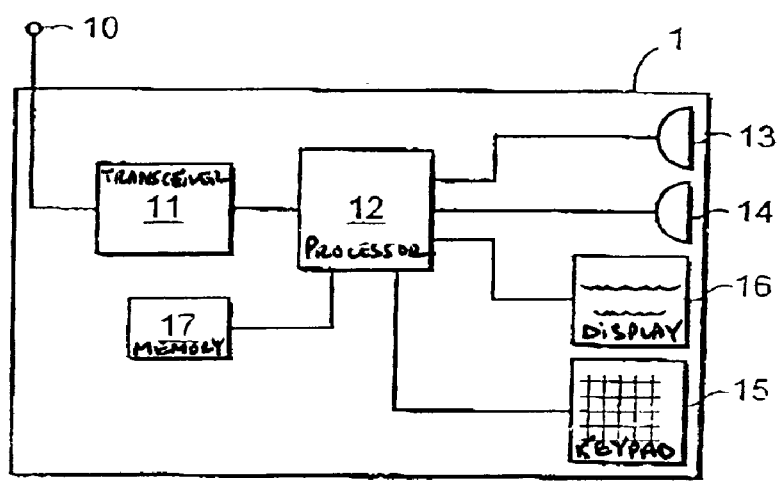
FIG. 2 shows schematically the structure of a mobile phone in the system of FIG. 1.

FIG. 2 shows the architecture of the mobile station 1. The phone comprises an antenna 10 connected to a radio transceiver section 11 which in transmission receives baseband signals and generates therefrom radio frequency signals for transmission, and in reception converts received radio frequency signals to baseband. The transceiver section is connected to a processor 12 which converts between the baseband signals and the audio signals received by microphone 13 and which drive loudspeaker 14. The processor 12 also receives signals from keypad 15 and drives display 16. The processor 12 is connected to a memory 17 which holds the instructions for operation of the processor and can be used by the processor to store information entered by a user, for example telephone numbers. The processor 12 includes a clock that is capable of telling the current time and date. The processor may be provided by one or more integrated circuits.

The mobile phone is set to determine its location by the procedure described above periodically. The phone suitably determines its location every 5 minutes, but other frequencies would be acceptable. To determine its location the control unit of the mobile phone transmits a message over the air to the locating unit 9 to initiate the locating process as described above. When the locating unit has determined the mobile phone's location it returns details of the location to the control unit of the mobile phone over the air. The location could be specified by grid reference co-ordinates (for example using a national grid system), or by longitude and latitude, and optionally by additional altitude information.

The mobile phone 1 has a diary/calendar function. The following table illustrates some possible entries in the diary.

| Time | Date | Place | Details |
|------|------|-------|---------|
| 09:00 | April 22 | Work | |
| 10:00 | April 22 | Meeting room "Lobster" | Product meeting |
| 16:30 | April 22 | Day care centre | Collect children |
| 17:00 | April 22 | Home | |
| 09:00 | April 23 | Work | |
| 12:00 | April 23 | Restaurant "Kapelli" | Lunch with N. O. Kia |
| 16:30 | April 23 | Day care centre | Collect children |
| 17:00 | April 23 | Home | |

A user does not have to enter all of a time, date, place and details for an entry, but the unit can make additional use of information in the time, date and place fields if they are entered.

The mobile phone is capable of enhancing operation of the diary by using the location information it has gathered. The mobile phone can use the location information to improve its reminders to a user based on the entries in the diary.

The mobile phone is capable of developing in the memory 17 a database containing entries which each comprise the name of a place and information defining the place's location. The name can be stored in the form used for the "place" filed of the diary or in another way. The location information can be stored in the form received from the network (e.g. as a national grid reference) or in another way. The data for the database can be gathered in several ways.

1. The mobile phone can receive the data, for example from an external connector 17 (FIG. 2) or over the air, as, for example, a file from the internet, and then store the data in memory 17 to form or to supplement the database.
2. The mobile phone can derive the data during use.
   a. A user can, by means of the keypad 15, cause the phone to determine its location and make an entry for that location in the database. The user then uses the keypad 15 to enter a place name corresponding to the location information.
   b. When the user arrives at the place whose name is stored in the diary for a current appointment he can, by means of the keypad 15, cause the mobile phone to determine the place's location and store that in the database together with the place name as stored in the diary. Thus, on arriving for an appointment at a place he has not visited before the user can cause the location of that place to be stored in the database in a convenient way.

c. The phone can be set to assume that the user has met the appointments stored in the diary unless the user indicates otherwise. Then at or shortly after the time of an appointment as stored in the diary the phone can automatically determine its location and store that information as an entry in the database together with the place name as entered in the diary.

If the phone is capable of storing location data locally and deriving location data over a network then it is preferred that the phone initially attempts to derive location information from the locally stored data and only attempts to derive location data over the network if the locally stored data is inadequate.

The following table illustrates some possible entries in the place database:

| Place | Location |
|---|---|
| Home | 123214, 645323, 200 |
| Work | 123192, 645310, 250 |
| Day care centre | 123201, 645610, 30 |

These locations are in the form: [x-grid-reference, y-grid-reference, altitude].

Some ways in which the operation of the diary is enhanced will now be described.

When a user makes a journey from one location to another (for instance from home to work on the morning of 23 April in the example diary set out above) the phone can, knowing the locations of "Home" and "Work" from the database, tell when the user has left home and arrived at work, and therefore calculate the time taken by the user to travel from home to work. The phone can store this journey time in a journey time database, together with the start and end place names of the journey ("Home" and "Work"). The stored journey time could be modified after subsequent journeys between the same places, for instance to store the mean or maximum journey time for the route. A user could also be able to enter directly the journey time for a route. Since the phone makes regular checks on its location it is aware of when it is at or within a set radius of one of the places whose locations are stored in the place database. If it knows the current time, knows that the user has an appointment is at another location ($loc_1$) at a time in the future ($t_{app}$), and knows a journey time ($t_{2-1}$) from the current location ($loc_2$) to that other location the unit can alert the user to the appointment at a suitable time ($t_{alert}$). That time is preferably calculated by:

$$t_{alert} = t_{app} - t_{2-1} \quad (1)$$

or:

$$t_{alert} = t_{app} - t_{2-1} - t_{advance} \quad (2)$$

where $t_{advance}$ is a set period in advance of the time calculated by equation 1 at which the user wises, for safety, to be alerted. This scheme allows the phone to give the user an alarm at a sensible time before his appointment.

The journey time could be calculated by determining the distance between the start and end places of the journey and dividing that by a speed, which could be fixed or variable depending on the distance. In particular a greater speed could be assumed for journeys between locations that are further apart. The user could enter one or more speeds to be used for this purpose.

If the time of an appointment is reached and the phone detects that it is already at the location of the place of the appointment (or within a set radius thereof) then it can omit to alert the user to the appointment, or use a modified form of alerting, for example a silent alert. This avoids interrupting the user's appointment with an alarm.

When a user makes an entry in the diary he does not have to enter a place name. However, doing so allows the phone to enhance the operation of the diary with the features described above. In entering the name of a place the user can enter the name directly or choose from a list of names in the place database. It is preferred that a hierarchical arrangement is used for the entries in the place database. This allows the location information stored for a smaller place that is within a larger place for which no location information is stored to substitute for the location information for that larger place. This is illustrated by the following example of a hierarchical structure that could be used:

| Hierarchy level | Place | Location | Radius (km) |
|---|---|---|---|
| 1 | Finland | None stored | 500 |
| 2 | Helsinki | None stored | 20 |
| 3 | Work | 123192, 645310, 250 | 0.1 |
| 4 | Meeting room "Lobster" | 123192, 645308, −210 | 0.01 |
| 4 | My Office | None stored | 0.01 |
| 3 | Home | 123192, 645310, 250 | 0.1 |
| 3 | Daycare centre | 123201, 645610, 30 | 0.1 |
| 1 | United Kingdom | None stored | 500 |
| 2 | London | None stored | 20 |

Here, a user can use the known location of "Work" to substitute for the unknown location of "Helsinki".

Each place may have a radius stored for it in the database. The radius information is suitably used as described above so that the unit infers itself to be at a place if it is within the radius set for that place of the location of that place or within that radius of a place lower in the hierarchy. The radius could be entered by a user or could be linked to the level of hierarchy (which could be set by a user), as in the above example.

Instead of being stored at the phone the diary information could be stored in a storage unit 20 (FIG. 1) in the telephone network. Entries made by the user could be transmitted over the air to the storage unit 20 and retrieved over the air by a user when needed. This may be especially efficient when the phone's location is determined by a network-side location centre. The phone could provide a user interface to a diary application provided at the network—for example by means of a hypertext transfer protocol (HTTP) or other web browsing connection. The user would therefore be provided with a web-based diary. The diary software could access the location information of the terminal and also trigger it to either send its location directly to the network-side diary application (e.g. using GPS positioning) or request it to locate itself and send the location information. If a network-side location centre has the capability to send an event notification to the network-side diary application then it could obtain the location information directly from the location centre without the need for any such information transfer from the terminal.

The diary functions described above could be implemented in other units than mobile phones or terminals, for example units that are principally personal organiser units or that have other functions. The unit could be capable of communicating with the telephone network for location measurement and communication functions but may not be capable of making conventional telephone calls. The unit could be incapable of communicating with the telephone network and could determine its position in another way, for example by means of the GPS system. In that case the unit could be in the form of a personal organiser including a GPS receiver.

The enhanced diary function as described herein is advantageous for people who lead varied or regular lifestyles. People who lead varied lifestyles will be able to build up a large database of location/distance information. People who lead regular lifestyles may find that the alerting times determined by the unit may follow more accurately the pattern of the user's activities.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

What is claimed is:

1. Location-dependant personal organiser apparatus for operation with a memory for storing a plurality of appointment entries, each appointment entry including data specifying a time and a place; the personal organiser comprising:
   a locating unit capable of determining the location of the personal organiser;
   a clock capable of determining the present time;
   an alerting unit for generating an alert to a user; and
   an alert processor coupled to the memory, the locating unit, the clock and the alerting unit and capable of actuating the alerting unit at a period before the stored time for an appointment entry that is dependant on the stored place for that appointment entry and the determined location of the personal organiser, the alert processor being further arranged to actuate the alerting unit in a manner dependent on the stored place for that appointment entry and the determined location of the personal organiser.

2. Location-dependant personal organiser apparatus as claimed in claim 1, wherein the personal organiser comprises at least part of the memory.

3. Location-dependant personal organiser apparatus as claimed in claim 2, wherein the locating unit is capable of periodically determining the location of the personal organiser and making that available to the alert processor.

4. Location-dependant personal organiser apparatus as claimed in claim 2, wherein the memory is capable of storing information defining the location of the place specified for the appointment entry.

5. Location-dependant personal organiser apparatus as claimed in claim 2, wherein the alert processor is capable of estimating the journey time needed to travel from the location of the personal organiser to the location of the place of the appointment entry and actuating the alerting unit at a period before the stored time for an appointment entry that is dependant on that journey time.

6. Location-dependant personal organiser apparatus as claimed in claim 2, wherein the locating unit is capable of determining the location of the personal organiser by means of a cellular telephone network.

7. Location-dependant personal organiser apparatus as claimed in claim 2, wherein the personal organiser is capable of acting as a cellular telephone for at least one of making and receiving telephone calls.

8. Location-dependant personal organiser apparatus as claimed in claim 2, wherein the alert is an audible alert.

9. Location-dependant personal organiser apparatus as claimed in claim 2, wherein the alert is a silent alert.

10. Location-dependant personal organiser apparatus as claimed in claim 1, wherein the locating unit is capable of periodically determining the location of the personal organiser and making that available to the alert processor.

11. Location-dependant personal organiser apparatus as claimed in claim 10, wherein the memory is capable of storing information defining the location of the place specified for the appointment entry.

12. Location-dependant personal organiser apparatus as claimed in claim 10, wherein the alert processor is capable of estimating the journey time needed to travel from the location of the personal organiser to the location of the place of the appointment entry and actuating the alerting unit at a period before the stored time for an appointment entry that is dependant on that journey time.

13. Location-dependant personal organiser apparatus as claimed in claim 10, wherein the locating unit is capable of determining the location of the personal organiser by means of a cellular telephone network.

14. Location-dependant personal organiser apparatus as claimed in claim 10, wherein the personal organiser is capable of acting as a cellular telephone for at least one of making and receiving telephone calls.

15. Location-dependant personal organiser apparatus as claimed in claim 10, wherein the alert is an audible alert.

16. Location-dependant personal organiser apparatus as claimed in claim 10, wherein the alert is a silent alert.

17. Location-dependant personal organiser apparatus as claimed in claim 1, wherein the memory is capable of storing information defining the location of the place specified for the appointment entry.

18. Location-dependant personal organiser apparatus as claimed in claim 17, wherein the alert processor is capable of estimating the journey time needed to travel from the location of the personal organiser to the location of the place of the appointment entry and actuating the alerting unit at a period before the stored time for an appointment entry that is dependent on that journey time.

19. Piously presented) location-dependant personal organiser apparatus as claimed in claim 17, wherein the locating unit is capable of determining the location of the personal organiser by means of a cellular telephone network.

20. Location-dependant personal organiser apparatus as claimed in claim 17, wherein the personal organiser is capable of acting as a cellular telephone for at least one of making and receiving telephone calls.

21. Location-dependant personal organiser apparatus as claimed in claim 17, wherein the alert is an audible alert.

22. Location-dependant personal organiser apparatus as claimed in claim 17, wherein the alert is a silent alert.

23. Location dependant personal organiser apparatus as claimed in claim 1, wherein the alert processor is capable of estimating the journey time needed to travel from the location of the personal organiser to the location of the place of the appointment entry arid actuating the alerting unit at a period before the stored time for an appointment entry that is dependent on that journey time.

24. Location dependant personal organiser apparatus as claimed in claim 23, wherein the alert processor is capable of actuating the alerting unit when it determines that the present time is after the time determined by subtracting the estimated journey time from the stored time of the appointment entry.

25. Location-dependant personal organiser apparatus as claimed in claim 24, wherein the locating unit is capable of determining the location of the personal organiser by means of a cellular telephone network.

26. Location-dependant personal organiser apparatus as claimed in claim 24, wherein the personal organiser is capable of acting as a cellular telephone for at least one of making and receiving telephone calls.

27. Location-dependant personal organiser apparatus as claimed in claim 24, wherein the alert is an audible alert.

28. Location-dependant personal organiser apparatus as claimed in claim 24, wherein the alert is a silent alert.

29. Location dependant personal organizer apparatus as claimed in claim 23, wherein the alert processor is capable of actuating the alerting unit when it determines that the present time is after the time determined by subtracting the estimated journey time and an additional time period from the stored time of the appointment entry.

30. Location-dependant personal organiser apparatus as claimed in claim 29, wherein the locating unit is capable of determining the location of the personal organiser by means of a cellular telephone network.

31. Location-dependant personal organiser apparatus as claimed in claim 29, wherein the personal organiser is capable of acting as a cellular telephone for at least one of making and receiving telephone calls.

32. Location-dependant personal organiser apparatus as claimed in claim 29, wherein the alert is an audible alert.

33. Location-dependant personal organiser apparatus as claimed in claim 29, wherein the alert is a silent alert.

34. Location-dependant personal organiser apparatus as claimed in claim 23, wherein the locating unit is capable of determining the location of the personal organiser by means of a cellular telephone network.

35. Location-dependant personal organiser apparatus as claimed in claim 23, wherein the personal organiser is capable of acting as a cellular telephone for at least one of making and receiving telephone calls.

36. Location-dependant personal organiser apparatus as claimed in claim 23, wherein the alert is an audible alert.

37. Location-dependant personal organiser apparatus as claimed in claim 23, wherein the alert is a silent alert.

38. Location-dependant personal organiser apparatus as claimed in claim 1, wherein the locating unit is capable of determining the location of the personal organiser by means of a cellular telephone network.

39. Location-dependant personal organiser apparatus as claimed in claim 38, wherein the personal organiser is capable of acting as a cellular telephone for at least one of making and receiving telephone calls.

40. Location-dependant personal organizer apparatus as claimed in claim 38, wherein the alert is an audible alert.

41. Location-dependant personal organiser apparatus as claimed in claim 38, wherein the alert is a silent alert.

42. Location-dependant personal organiser apparatus as claimed in claim 1, wherein the personal organiser is capable of acting as a cellular telephone for at least one of making and receiving telephone calls.

43. Location-dependant personal organiser apparatus as claimed in claim 42, wherein the alert is an audible alert.

44. Location-dependant personal organiser apparatus as claimed in claim 42, wherein the alert is a silent alert.

45. Location-dependant personal organiser apparatus as claimed in claim 1, wherein the alert is an audible alert.

46. Location-dependant personal organiser apparatus as claimed in claim 1, wherein the alert is a silent alert.

* * * * *